3,250,764
NEW ANTHRANILIC ACID HYDRAZIDES
Paul Schmidt, Therwil, Kurt Eichenberger, Basel, Alberto Rossi, Oberwil, Basel-Land, and Max Wilhelm, Basel, Switzerland, assignors to Ciba Corporation, New York, N.Y., a corporation of Delaware
No Drawing. Filed Aug. 22, 1962, Ser. No. 218,537
Claims priority, application Switzerland, Sept. 12, 1961, 10,581/61; Dec. 7, 1961, 14,202/61; July 4, 1962, 8,029/62
24 Claims. (Cl. 260—239.8)

The present invention relates to benzoic acid hydrazides which are substituted in the nucleus in 2-position by an amino group and in 5-position by a sulfonyl group that is substituted by a lower aliphatic hydrocarbon radical, as well as to salts of these compounds.

The nucleus of the new compounds may contain further substituents such, for example, as lower alkyl- or alkoxy groups, especially those containing 1–4 carbon atoms, such as the methyl-, ethyl-, n- or isopropyl- or -butyl-, methoxy-, ethoxy-, propoxy-, or butoxy groups, or halogen atoms, such as fluorine, chlorine, bromine or iodine or the pseudohalogen radical trifluoromethyl.

The hydrazine group is preferably unsubstituted, although it may be substituted, for example, by aliphatic, araliphatic, heterocyclic aliphatic, aromatic or heterocyclic radicals or by acyl radicals of the same kind, these substituents groups being bound to the hydrazine group if desired by single or double linkages. Groups of this kind are, for example, lower alkyl groups such, for example, as the above mentioned lower alkyls and alkylidenes such as ethylidene, propylidene-(1) or -(2), butylidene bound in any desired manner, phenylalkyl or -alkylidenes such as benzyl, phenylethyl or benzylidene, heterocyclylalkyl or -alkylidenes such as pyridylmethyl or -ethyl, pyridylmethylidene or furfurylidene, phenyl, pyridyl, furyl, tetrahydrofuryl or -pyranyl. As examples of acyl radicals, there are lower alkoxycarbonyl groups such as methoxy- or ethoxycarbonyl, acetyl, propionyl, butyryl, pivalyl, valeroyl, caproyl, oenanthoyl, lauroyl, β-dimethylacryloyl, succinyl, phenylacetyl, cinnamoyl, benzoyl, phthaloyl, pyridoyl, furoyl, pyridylacetyl or thienylacetyl. Of the aforementioned groups, the aromatic rings may be further substituted by lower alkyl- or alkoxy groups, by the methylenedioxy group, by a halogen atom or by a trifluoromethyl-, nitro- or amino group, for example, by a dialkylamino group such as the dimethylamino- or diethylamino group. The aliphatic group may also contain a hydroxyl-, mercapto- or amino group or a halogen atom.

The amino group present in the nucleus of the new benzoic acid hydrazides is preferably unsubstituted, although it may be mono- or di-substituted, for example a mono- or di-alkylamino group or an acylamino group, acyl groups being, for example those mentioned as suitable substituents for the hydrazine group.

The lower aliphatic hydrocarbon radicals of the sulfonyl group are, for example, lower alkyl- or alkenyl groups such as the methyl-, ethyl-, n- or isopropyl-, or the straight- or branch-chained butyl-, pentyl-, hexyl-, heptyl groups bound at any desired position or allyl- or methallyl groups.

The new compounds possess valuable, chemotherapeutic properties. They are especially valuable with regard to their action against gram-positive and gram-negative pathogens, especially against Staphylococci and Pneumococci, and against mycobacteria. They can, therefore, be used pharmacologically in animals or as medicaments or prophylactic agents in the treatment of man and animals. They may also be used as additives to animal feedstuffs and as intermediates in the manufacture of other valuable chemotherapeutic substances.

The compounds corresponding to the Formula I

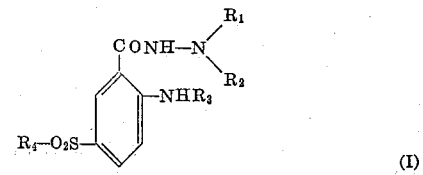

and salts thereof, in which $R_1$ and $R_2$ represent hydrogen atoms or lower aliphatic radicals, or together my represent a doubly bound aliphatic, cycloaliphatic or saturated heterocyclic radical, such as an optionally substituted alkylidene, cycloalkylidene or azacycloalkylidene, such as piperidylidene radical or a hydrogen atom and an acyl radical of a lower aliphatic carboxylic acid, $R_3$ represents a hydrogen atom or the acyl radical of a lower aliphatic carboxylic acid, and $R_4$ represents a lower alkyl group, and compounds of this type in which $R_3$ represents a lower alkyl radical, are particularly effective.

The substituents of alkylidene radicals are, for example, tertiary amino groups, such as lower dialkylamino, pyrrolidino, piperidino, morpholino or optionally N-alkylated piperazino groups, those of cycloalkylidene radicals, for example lower alkyl radicals, those of azacycloalkylidene radicals for example lower alkyl radicals positioned at the nitrogen atom.

The outstanding members of the group of compounds corresponding to the Formula I, are those in which $R_1$, $R_2$ and $R_3$ represent a hydrogen atom and $R_4$ a lower alkyl group, and especially 5-isopropyl-sulfonyl-anthranilic acid-hydrazide and salts thereof, and those in which $R_1$ and $R_2$ represent hydrogen and $R_3$ and $R_4$ lower alkyl radicals and such in which $R_1$ and $R_2$ together represent a tertiary amino-lower alkylidene or an N-lower alkyl-piperidylidene radical and $R_3$ and $R_4$ have the meanings given above.

The new compounds are prepared according to methods in themselves known. Thus, for example, a 5-R-SO₂-2-aminobenzoic acid in which R is a lower aliphatic hydrocarbon radical, or a reactive, functional derivative thereof may be reacted with a hydrazine.

Reactive, functional derivatives of sulfonylbenzoic acids are, for example, the halides thereof, such as the chloride or bromide, or esters, for example alkyl- or aralkyl esters, such as methyl-, ethyl- or benzyl ester, or activated esters, such as the cyanmethyl ester.

The reaction of the above-mentioned compounds with the hydrazine, is carried out by a method in itself known, above all in the presence of a solvent or diluent, in the presence or absence of a reaction accelerator, at room temperature or preferably at a raised temperature, if necessary in a closed vessel under super-atmospheric pressure and/or under an inert gas such, for example, as nitrogen. If desired, a condensing agent may be used, for example, when an acid-halide is used, a basic condensing agent or an excess of the hydrazine compound may be used.

Further substituents may be introduced into the compounds so obtained, by the usual methods, or substituents already present may be altered or removed. Thus, for example, acylatable compounds obtained may be acylated by a known method, or acylated compounds may be hydrolyzed. The other nitrogen substituents mentioned above may also be introduced, for example, by reaction with reactive esters of the corresponding alcohols or with corresponding carbonyl compounds. Groups which, for example, may be doubly bound to the hydrazine group, may either be reduced to singly bound groups or removed by hydrolysis.

The above-mentioned reactions are carried out in the usual manner, in the presence or absence of a solvent or condensing agent and/or catalyst, at subnormal, normal or raised temperatures, if desired in a closed vessel and/or in an inert gas atmosphere.

The sulfonyl-benzoic acids or their reactive, functional derivatives used as starting materials, which contain an amino- group or a halogen atom in the nucleus in the 2-position, and which may, if desired, also contain the other nuclear-substituents mentioned above, insofar as they are new compounds, constitute a further provision of the present invention. They may be prepared according to methods in themselves known.

The invention also concerns modifications of the process, wherein a compound obtainable as an intermediate from any stage of the process is used as starting material, the missing stages being then carried out, or wherein a starting material is formed under the given reaction conditions or is used as a hydrate or salt thereof.

Depending upon the reaction conditions and starting materials used, the new compounds are obtained in their free form, or in the form of their salts. The salts of the new compounds may be converted into the free compounds by methods in themselves known, for example acid addition salts may be converted by reaction with a base. Conversely, if a free base should be obtained, it may be converted into the salt thereof by treatment with an inorganic or organic acid. Acid-addition salts may be prepared with the use especially of therapeutically suitable acids, for example hydrohalic acids such, for example, as hydrochloric acid or hydrobromic acid, or perchloric acid, nitric acid, thiocyanic acid, sulfuric acid or phosphoric acid, or organic acids, such as formic acid, acetic acid, propionic acid, glycollic acid, lactic acid, pyruvic acid, oxalic acid, malonic acid, succinic acid, maleic acid, fumaric acid, malic acid, tartaric acid, citric acid, ascorbic acid, hydroxymaleic acid, dihydroxymaleic acid, benzoic acid, phenylacetic acid, 4-aminobenzoic acid, 4-hydroxybenzoic acid, anthranilic acid, cinnamic acid, mandelic acid, salicylic acid, 4-aminosalicylic acid, 2-phenoxybenzoic acid, 2-acetoxybenzoic acid, methane-sulfonic acid, ethane-sulfonic acid, hydroxyethane-sulfonic acid, benzene-sulfonic acid, para-toluene-sulfonic acid, naphthalene-sulfonic acid, or sulfanilic acid, or methionine, tryptophane, lysine or arginine. The salts obtained may be mono- or poly- salts.

The new compounds may be used as medicaments in the form of pharmaceutical preparations, which comprise the new compound in admixture or conjunction with an organic or inorganic, solid or liquid pharmaceutical excipient, that is suitable for local or enteral, for example oral, or parenteral administration. These excipients are, for example, compounds which do not undergo reaction with the new compounds, and are such, for example, as water, gelatine, lactose, starch, magnesium stearate, talc, vegetable oils, benzyl alcohols, gums, polyalkylene glycols, white petroleum jelly, cholesterol or other known medicinal excipients.

The pharmaceutical preparations may be made in the form, for example, of tablets, dragees or capsules, or in liquid form as solutions, suspensions or emulsions. If desired, they may be sterilized and/or contain assistants, such as preserving-, stabilizing-, wetting- or emulsifying agents, salts for regulating the osmotic pressure or buffers. They may also comprise other therapeutically valuable substances.

The new compounds may also be used in the breeding and feeding of animals, in the form of feeding-stuffs, or as additives to animal feeding-stuffs, and for this purpose, for example, the usual vehicles, diluents or fodders may be used.

The following examples illustrate the invention.

EXAMPLE 1

5 grams of 5-isopropylsulfonyl-anthranilic acid-methyl ester are boiled under reflux with 50 cc. of hydrazine hydrate, for four hours. The mixture is then evaporated to dryness under vacuum, the residue is triturated with water, and then filtered to isolate the crystalline precipitate so obtained. By re-crystallization from alcohol, 5-isopropylsulfonyl-anthranilic acid-hydrazide of the formula

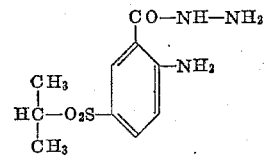

is obtained as white crystals melting at 178–179° C.

EXAMPLE 2

5 grams of 5-methylsulfonyl-anthranilic acid methyl ester are boiled under reflux for 3 hours with 50 cc. of hydrazine hydrate. The reaction mixture is then evaporated to dryness under reduced pressure, the residue taken up in 20 cc. of water and adjusted to pH 7 with 2N-acetic acid. On cooling, a crystalline precipitate settles out, which is recrystallized from water to yield 5-methylsulfonyl-anthranilic acid hydrazide of the formula

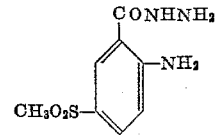

in the form of white crystals melting at 172–175° C.

EXAMPLE 3

6 grams of 5-ethylsulfonyl-anthranilic acid methyl ester are boiled under reflux for 2 hours with 60 cc. of hydrazine hydrate. The reaction mixture is evaporated to dryness under reduced pressure, the residue is triturated with water, the reaction mixture adjusted to pH 7 with 2N-hydrochloric acid and the precipitated crystals filtered off. By recrystallization from water there is obtained 5-ethylsulfonyl-anthranilic acid hydrazide of the formula

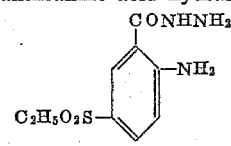

in the form of white crystals melting at 171–175° C.

EXAMPLE 4

8 grams of 5-n-butylsulfonyl-anthranilic acid methyl ester are boiled under reflux for 2½ hours with 80 cc. of hydrazine hydrate. The reaction mixture is evaporated to dryness under reduced pressure, 30 cc. of water are added to the residue and the reaction solution is adjusted to pH 7 with 2N-hydrochloric acid. On trituration the oily mass solidifies to form a crystalline precipitate which is recrystallized from a mixture of ethanol and water to yield 5-n-butylsulfonyl-anthranilic acid hydrazide of the formula

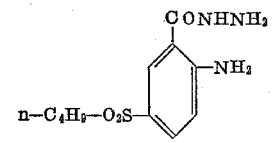

in the form of white crystals melting at 156–158° C.

The starting materials used in the preceding examples may be prepared, for example as follows:

(a) 2-chloro-5-alkylsulfonyl-benzoic acids 127.5 grams of 2-chloro-5-chlorosulfonyl-benzoic acid are added in small portions, with stirring, to a solution of 378 grams of sodium sulfite (Na$_2$SO$_3$.7H$_2$O) in 500 cc. of water. At the same time 145 cc. of 10N-sodium hydroxide solution are added so that the reaction solution always shows a pH of 9. By means of ice-cooling care is taken that the internal temperature never rises above 25° C. After adding the last portion of the sulfochloride, the reaction mixture is stirred for 4 hours at room temperature. The reaction solution is cooled to 0° C. and then treated with 220 cc. of concentrated hydrochloric acid while cooling with ice, a white precipitate forming. After the filtered crude sulfinic acid has been dissolved in 100 cc. of water and 200 cc. of ethanol, the reaction solution is adjusted to pH 9 with 10N-sodium hydroxide solution, while stirring; 200 grams of ethyl bromide are added and the whole boiled under reflux for 36 hours. During this time the reaction solution is kept constantly weakly alkaline by the addition of small portions of 10N-sodium hydroxide solution. The bulk of the ethanol is removed under reduced pressure and the aqueous alkaline solution acidified with concentrated hydrochloric acid while cooling with ice. The precipitated solid substance is filtered off, recrystallized from a mixture of ethanol and water to yield 2-chloro-5-ethyl-sulfonyl-benzoic acid in the form of white crystals melting at 151–153° C.

In an analogous manner there may be obtained 2-chloro-5-isopropylsulfonyl-benzoic acid melting at 132–134° C., 2-chloro-5-methylsulfonyl-benzoic acid melting at 182–185° C. and 2-chloro-5-n-butyl-sulfonyl-benzoic acid melting at 137–139° C.

(b) *5-alkylsulfonyl-anthranilic acids*

62 grams of 2-chloro-5-methyl-sulfonyl-benzoic acid of M.P. 182–185° C. are heated in a pressure vessel with 700 cc. of concentrated ammonia solution and 1.5 grams of copper powder for 12 hours at 125–130° C. The cooled, filtered ammonia solution is introduced into concentrated hydrochloric acid with stirring and ice-cooling until the reaction mixture is finally just weakly acid to Congo red. The crystalline precipitate which has formed is filtered off and recrystallized from a mixture of ethanol and water to yield 5-methylsulfonyl-anthranilic acid melting at 234–235° C.

In an analogous manner there may be obtained 5-isopropylsulfonyl-anthranilic acid melting at 213–216° C., 5-ethylsulfonyl-anthranilic acid melting at 209–211° C. and 5-n-butylsulfonyl-anthranilic acid melting at 175–178° C.

(c) *5-alkylsulfonyl-anthranilic acid methyl esters*

30 grams of 5-methylsulfonyl-anthranilic acid are introduced into a solution of 25 cc. of sulfuric acid monohydrate in 90 cc. of absolute methanol and the whole is boiled under reflux for 16 hours. The cooled reaction solution is then poured on to ice, extracted with methylene chloride, the organic layer washed with sodium bicarbonate solution and after being dried over magnesium sulfate evaporated under reduced pressure. By recrystallizing the solid residue from a mixture of isopropanol and petroleum ether there is obtained 5-methyl-sulfonyl-anthranilic acid methyl ester melting at 139–145° C.

In an analogous manner there may be obtained 5-isopropylsulfonyl-anthranilic acid methyl ester melting at 142–144° C., 5-ethylsulfonylanthranilic acid methyl ester melting at 90–94° C. and 5-n-butylsulfonyl-anthranilic acid methyl ester (oil).

EXAMPLE 5

7 grams of 2-ethylamino-5-methyl-sulfonyl-benzoic acid methyl ester are boiled under reflux together with 70 cc. of hydrazine hydrate for 2 hours. The reaction mixture is evaporated to dryness under reduced pressure, the residue is triturated with water and the crystalline precipitate filtered off, recrystallized from a mixture of ethanol and water to yield 2-ethylamino-5-methylsulfonyl-benzoic acid hydrazide of the formula

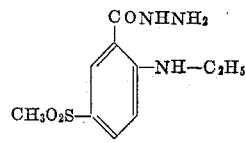

in the form of white crystals melting at 168–171° C.

The 2-ethylamino-5-methyl-sulfonyl-benzoic acid methyl ester used as starting material may be prepared as follows:

70 grams of 2-chloro-5-methyl-sulfonyl-benzoic acid are heated in a pressure vessel with 700 cc. of an aqueous ethylamine solution of 25% strength and 1.5 grams of copper powder for 14 hours at 125–130° C. The reaction mixture is cooled to room temperature, filtered and the filtrate poured with stirring and ice-cooling into concentrated hydrochloric acid until the reaction mixture is finally just weakly acid to Congo red. The precipitate formed is filtered off and recrystallized from a mixture of ethanol and water to yield 2-ethylamino-5-methyl-sulfonyl-benzoic acid melting at 185–190° C.

35 grams of the amino acid are added to a solution of 30 cc. of sulfuric acid monohydrate in 100 cc. of methanol and boiled under reflux for 16 hours. The reaction mixture is cooled, poured on to ice and extracted with methylene chloride. After washing the organic layer with sodium bicarbonate solution, drying over magnesium sulfate and evaporating the solvent under reduced pressure, the residue is recrystallized from a mixture of isopropanol and petroleum ether to yield 2-ethylamino-5-methylsulfonyl-benzoic acid methyl ester melting at 120–122° C.

EXAMPLE 6

A solution of 2 grams of N-methyl-piperidone-(4) in 5 cc. of absolute alcohol is added to 2.29 grams of 5-methylsulfonyl-anthranilic acid hydrazide in 70 cc. of absolute alcohol with stirring, and the whole is boiled under reflux for 16 hours. The reaction mixture is then evaporated to dryness and the residue recrystallized from alcohol. There is obtained 5-methylsulfonyl-anthranilic acid-N'-(N-methyl-piperidylidene-(4))-hydrazide of the formula

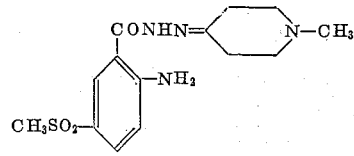

melting at 202–203° C.

The hydrochloride of the above base is prepared as follows: A suspension of 1.62 grams of the base in 25 cc. of absolute alcohol is treated with heating with the calculated quantity of hydrogen chloride in alcohol, the whole passing into solution. After a short time the hydrochloride precipitates in the form of white crystals melting at 224–227° C.

What is claimed is:

1. A compound of the formula:

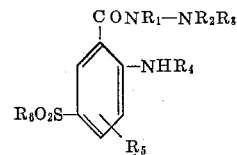

wherein $R_1$ stands for a member selected from the group consisting of hydrogen and lower alkyl, $R_2$ stands for a member selected from the group consisting of hydrogen, lower alkyl, phenyl-lower alkyl substituted phenyl-lower alkyl, substituted in the phenyl ring by a member selected from the group consisting of lower alkyl, lower alkoxy, methylenedioxy, halogen, trifluoromethyl, nitro, amino and di-lower alkylamino, pyridyl-lower alkyl, lower alkoxycarbonyl and lower alkanoyl, $R_3$ stands for a member selected from the group consisting of hydrogen, lower alkyl, phenyl-lower alkyl, pyridyl-lower alkyl and $R_2$ and $R_3$ together stand for a member selected from the group consisting of lower alkylidene, phenyl-lower alkylidene, cyclo-lower alkylidene, monoaza-cyclo-lower alkylidene, $R_4$ stands for a member selected from the group consisting of hydrogen, lower alkyl and lower alkanoyl, $R_5$ stands for a member selected from the group consisting of hydrogen, lower alkyl, lower alkoxy, halogeno and trifluoromethyl, and $R_6$ stands for lower alkyl.

2. An acid addition salt of a compound of claim 1.
3. A compound of the formula:

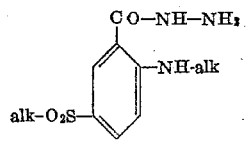

wherein "alk" stands for lower alkyl.

4. An acid addition salt of a compound of claim 3.
5. A compound of the formula:

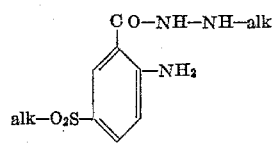

wherein "alk" is lower alkyl.

6. A compound of the formula:

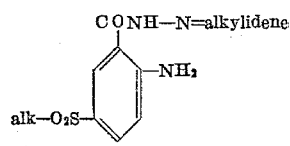

wherein "alkylidene" is lower alkylidene and "alk" is lower alkyl.

7. A compound of the formula:

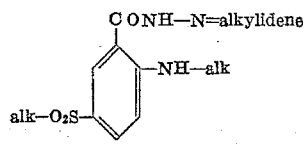

wherein "alkylidene" is lower alkylidene and "alk" is lower alkyl.

8. A compound of the formula:

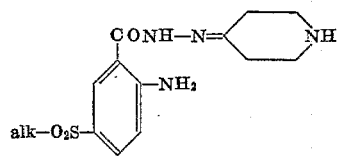

wherein "alk" is lower alkyl.

9. A compound of the formula:

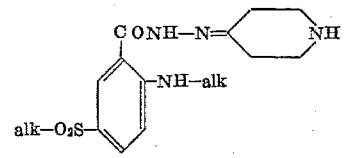

wherein "alk" is lower alkyl.

10. A compound of the formula:

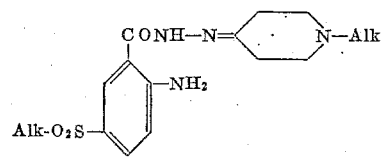

wherein "alk" is lower alkyl.

11. A compound of the formula:

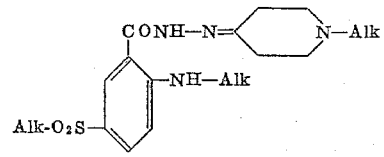

wherein "alk" is lower alkyl.

12. An acid addition salt of a compound of claim 5.
13. An acid addition salt of a compound of claim 6.
14. An acid addition salt of a compound of claim 7.
15. An acid addition salt of a compound of claim 8.
16. An acid addition salt of a compound of claim 9.
17. A compound of the formula

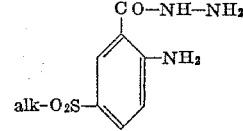

wherein "alk" is lower alkyl.

18. An acid addition salt of the compounds of claim 17.
19. 5-isopropylsulfonyl-anthranilic acid hydrazide.
20. 5-methylsulfonyl-anthranilic acid hydrazide.
21. 5-ethylsulfonyl-anthranilic acid hydrazide.
22. 5-n-butylsulfonyl-anthranilic acid hydrazide.
23. 2-ethylamino-5-methylsulfonyl-benzoic acid hydrazide.
24. 5 - methylsulfonyl - anthranilic acid-N'-(N-methylpiperidylidene-(4))-hydrazide.

References Cited by the Examiner

UNITED STATES PATENTS

| | | | |
|---|---|---|---|
| 2,551,056 | 5/1951 | Schetty | 260—147 |
| 2,828,299 | 3/1958 | Von Glahn et al. | 260—558 |
| 2,859,242 | 11/1958 | Moyle et al. | 260—518 |
| 2,862,956 | 12/1958 | Gundell et al. | 260—470 |
| 2,874,189 | 2/1959 | Micucci et al. | 260—558 |
| 2,987,517 | 6/1961 | Martin et al. | 260—293.4 |

FOREIGN PATENTS

| | | |
|---|---|---|
| 586,999 | 10/1947 | Great Britain. |
| 864,829 | 4/1961 | Great Britain. |
| 351,281 | 2/1961 | Switzerland. |

OTHER REFERENCES

Beilstein's Handbuch der Organische Chemie: 4th ed., vol. 14, p. 323, Verlag von Julius Springer, Berlin, Germany (1931).

Katz et al.: J. Org. Chem., vol. 18, pp. 1380 to 1402 (1953).

Zincke et al.: Ber. Deut. Chem., vol. 45, pp. 1497 and 1508 (1912).

WALTER A. MODANCE, *Primary Examiner.*

ROBERT L. PRICE, NATLIE TROUSOF, JOHN RANDOLPH, *Assistant Examiners.*